(12) United States Patent
Macadams et al.

(10) Patent No.: US 11,377,530 B2
(45) Date of Patent: Jul. 5, 2022

(54) TOUGHENED ADHESIVE AND BONDING METHOD USING THE SAME

(71) Applicant: CYTEC INDUSTRIES INC., Princeton, NJ (US)

(72) Inventors: Leonard Macadams, Woolwich Township, NJ (US); Dalip K. Kohli, Churchville, MD (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 79 days.

(21) Appl. No.: 16/485,071

(22) PCT Filed: Dec. 18, 2018

(86) PCT No.: PCT/US2018/066147
§ 371 (c)(1),
(2) Date: Aug. 9, 2019

(87) PCT Pub. No.: WO2019/126111
PCT Pub. Date: Jun. 27, 2019

(65) Prior Publication Data
US 2020/0308358 A1  Oct. 1, 2020

Related U.S. Application Data

(60) Provisional application No. 62/608,733, filed on Dec. 21, 2017.

(51) Int. Cl.
| | | |
|---|---|---|
| C09J 7/30 | (2018.01) | |
| C09J 7/10 | (2018.01) | |
| B32B 27/38 | (2006.01) | |
| C08J 5/24 | (2006.01) | |
| C09J 7/25 | (2018.01) | |
| B32B 7/12 | (2006.01) | |
| B32B 15/01 | (2006.01) | |
| C09J 5/06 | (2006.01) | |
| C08K 5/315 | (2006.01) | |

(52) U.S. Cl.
CPC .............. *C08J 5/24* (2013.01); *B32B 7/12* (2013.01); *B32B 15/01* (2013.01); *C09J 5/06* (2013.01); *C09J 7/25* (2018.01); *C08J 2363/00* (2013.01); *C08J 2477/00* (2013.01); *C08K 5/3155* (2013.01); *C09J 2301/124* (2020.08); *C09J 2301/408* (2020.08); *C09J 2400/26* (2013.01); *C09J 2463/00* (2013.01)

(58) Field of Classification Search
None
See application file for complete search history.

(56) References Cited

U.S. PATENT DOCUMENTS 9,187,636 B2    11/2015  Wang
2006/0252334 A1*  11/2006  LoFaro .................... C08J 5/046
                                                          442/400

FOREIGN PATENT DOCUMENTS

| JP | 2006198920 A | 8/2006 |
| WO | 02028623 A1 | 4/2002 |
| WO | 2017083631 A1 | 5/2017 |

\* cited by examiner

*Primary Examiner* — Michael J Feely
(74) *Attorney, Agent, or Firm* — Thi Dang

(57) ABSTRACT

A bonding method for joining two structural parts using a curable adhesive layer having a fibrous veil embedded therein. The fibrous veil carries a polymeric binder, which is in a solid phase at room temperature (20° C.-25° C.) and is capable of dissolving into the adhesive composition during curing thereof.

20 Claims, No Drawings

TOUGHENED ADHESIVE AND BONDING METHOD USING THE SAME

CROSS-REFERENCE TO RELATED APPLICATIONS

The present application is a U.S. national phase entry under 35 U.S.C. § 371 of International Application No. PCT/US2018/066147, filed on 18 Dec. 2018, which claims priority to U.S. provisional application No. 62/608,733, filed on 21 Dec. 2017, the entire content of each of these applications is explicitly incorporated herein by reference.

DETAILED DESCRIPTION

Structural adhesives composed of thermoset resins, such as epoxy resins, have been conventionally used for structural bonding in the manufacturing of structural parts that demand stringent mechanical requirements such automobile and aircraft body parts. It is desirable for such structural adhesives to have high shear strength, high impact resistance, toughness, and other mechanical performance properties for joining both metal and composite structures. Moreover, the structural adhesives for aerospace application must have the durability to withstand the harsh environmental conditions.

Although some conventional adhesive compositions can result in bonded structures with increased strength and improved toughness, there is frequently a penalty to other physical properties of the compositions, including, for example, a reduction in the glass transition temperature ($T_g$) or an increase in moisture absorption properties. Also, it is frequently found that an increase in toughness causes a concomitant decrease in strength and vice versa. Thus, it is often difficult to increase simultaneously both the strength and toughness of an adhesive.

Incorporation of thermoplastic and elastomeric toughening agents into adhesive compositions is often performed to affect the mechanical properties of the bonded structures. Conventional methods of toughening epoxy-based adhesive compositions include: (1) addition of a soluble thermoplastic toughening agent to the epoxy resin; (2) addition of a compatible elastomer polymer to the epoxy resin; (3) dispersion of fine toughening rubber particles into the epoxy resin. In all cases, careful consideration of the mix conditions, including heating and reaction time, must be diligently monitored to ensure proper blending, dispersion, or reaction. Thus, there exists manufacturing constraints which add costs and decrease production rates. Additionally, the amount of toughening agent that can be incorporated into the epoxy resin composition is limited because the addition of toughening agents affects the viscosity and rheological properties of the resin composition.

Furthermore, although the addition of thermoplastic polymer and other toughening agents are known to generally improve the ductility and impact resistance of thermosetting resins, the overall effect of adding such toughening agents on the resulting structural adhesives is not always beneficial. In most instances, the increase in adhesive toughness is only marginal and a reduction in mechanical properties at high temperature and resistance to environmental degradation is frequently encountered.

Therefore, it would be beneficial to provide a method of incorporating toughening agents into thermosetting structural adhesive compositions, wherein the toughening agent is added to the adhesive composition following the fabrication of the adhesive film so that the handling and processing of the resin film would not be an issue.

The present disclosure includes a bonding method for joining two structural parts using a thermally curable adhesive layer having a fibrous veil embedded therein. The fibrous veil carries a polymeric binder, which is in a solid phase at room temperature (20° C.-25° C.) and is capable of softening and dissolving at a temperature just below the curing temperature of the adhesive composition.

Binder-Containing Veil

In one embodiment, the veil's polymeric binder is capable of undergoing at least partial phase transition to a fluid phase, at a temperature in the range of 75° F. to 500° F. (24° C.-260° C.), preferably 100° F. to 400° F. (37.7° C.-204.4° C.) or 150° F. to 350° F. (65.5° C.-176.7° C.). Generally, the phase transition of the polymeric binder should occur between room temperature and the temperature for substantial onset of gelation and/or coalescence of the curable adhesive composition. Upon curing of the adhesive composition, the polymeric binder dissolves and flows into the thermosetting matrix of the adhesive layer. In some embodiments, the polymeric binder fully dissolves into the thermosetting matrix.

The binder is distributed on the outer surfaces of the veil fibers and/or dispersed throughout the veil structure. The binder may be present on the veil in particulate form, for example, as binder particles dispersed throughout the veil structure.

The veil's polymeric binder may be derived from thermoplastic or elastomeric polymers or a hybrid mixture of thermoplastic and elastomeric materials. In some embodiments, the polymeric binder contains an amorphous or semi-crystalline thermoplastic polymer having a relatively low glass transition temperature, e.g., less than 350° F. (<176.7° C.) or less than 250° F. (<121° C.) as measured by Dynamic Mechanical Analysis. In the context of the present disclosure, the glass transition temperature is defined as the temperature region where the polymer transitions from a hard, glassy matrial to a soft, rubbery material. Suitable thermoplastic polymers include polyamide, polyester, polyimide, polycarbonate, polyurethane, polyetherimide, polyethersulfone, poly(methyl methacrylate), polystyrene, polyarylsuphone (including polysulphone, polyethersulphone, polyetherethersulphone), copolymers and combinations thereof. In one embodiment, the thermoplastic binder is a copolymer of two different polyamides, for example, a copolymer of polyamide 11 and polyamide 12 ("PA11/PA12"). The ratio of polyamide 11 to polyamide 12 may be varied, for example, 20:80 to 80:20. It has been discovered that the thermoplastic binder in the veil functions as a toughening agent, which improves the bond strength of the bonded structures.

In one embodiment, the veil is composed of intermingled, randomly oriented polymer fibers. The fibers may be chopped or continuous. The polymeric binder may be incorporated into the veil during the manufacturing thereof. In other embodiments, the veil is a woven fabric or knitted mat. The amount of binder in or on the veil may be up to about 10% by weight, in some embodiments, about 1% to about 5% by weight, based on the total weight of the veil. For a nonwoven veil, the amount of polymeric binder in the veil is sufficient to hold the fibers together and to maintain the integrity of the veil.

The fibers of the veil may have diameters in the range of about 0.1 to 100 microns, in some embodiments, 1.0 to 50 microns. The veil may have an areal weight of about 2 to about 150 grams per square meter (gsm), in some embodiments, 4 to 20 gsm. The fiber composition of the veil may be selected from polyester, polyamide (or nylon), glass, polyimide, other suitable thermoplastic materials with a low glass transition temperature, for example, 30° C.-120° C., and capable of dissolving in thermoset resins, such as epoxy resins, during curing thereof, and combination thereof.

The nonwoven fibrous veil disclosed herein may be produced by a conventional wet-laid process, as an example. In a wet-laid process, chopped fibers are dispersed in aqueous slurry which may contain a binder, and optionally, additives such as surfactant(s), viscosity modifier(s), defoaming agent(s), drainage aids and/or other chemical agents. The specific additives are selected to achieve a stable dispersion of fibers in water for the duration of the wet-laid manufacturing process. Once the chopped fibers are introduced into the slurry, the slurry is intensely agitated so that the fibers become dispersed. The slurry containing the fibers and particles is then deposited onto a moving screen where a substantial portion of the water is removed to form a sheet. Subsequently, the liquid may be removed from the sheet by vacuum and/or hot air drying. Such wet-laid processes are typically used when a uniform distribution of fibers and/or weight is desired.

In the case of a woven or knitted fabric, the binder may be applied as a dry powder or a binder solution, e.g., by coating or spraying, to the fabric after manufacturing thereof to improve the bond strength of the bonded structures as discussed above.

Since the polymeric binder functions as a toughening material and is applied separately to the veil rather than mixed into the adhesive composition, the viscosity of the adhesive composition is not affected. Hence, the rheology required for forming a resin film is also not affected. As a result, a larger quantity of toughening material can be incorporated into the resulting adhesive film than would otherwise be feasible by mixing the toughening agents with other components of the adhesive composition.

Adhesive Composition

The binder-containing veil described above is embedded in a thermally curable adhesive composition, which contains one or more thermoset resins, curing agent(s) and/or catalyst(s), and optionally, toughening agents, conductive additives, modifiers, and fillers. The thermoset resins include, but are not limited to, epoxy resins, unsaturated polyester resin, bismaleimide, polyimide, cyanate ester, phenolic, etc.

Particularly suitable are multifunctional epoxy resins (or polyepoxides) having a plurality of epoxide functional groups per molecule. The polyepoxides may be saturated, unsaturated, cyclic, or acyclic, aliphatic, aromatic, or heterocyclic polyepoxide compounds. Examples of suitable polyepoxides include the polyglycidyl ethers, which are prepared by reaction of epichlorohydrin or epibromohydrin with a polyphenol in the presence of alkali. Suitable polyphenols therefore are, for example, resorcinol, pyrocatechol, hydroquinone, bisphenol A (bis(4-hydroxyphenyl)-2,2-propane), bisphenol F (bis(4-hydroxyphenyl) methane), fluorine 4,4'-dihydroxy benzophenone, bisphenol Z (4,4'-cyclohexylidene bisphenol), and 1,5-hyroxynaphthalene. Other suitable polyphenols as the basis for the polyglycidyl ethers are the known condensation products of phenol and formaldehyde or acetaldehyde of the novolac resin-type.

Examples of difunctional epoxy resins include digylcidyl ethers of bisphenol A-based materials (e.g. Epon™ 828 (liquid epoxy resin) from Hexion, DER 331, D.E.R. 661 (solid epoxy resin) supplied by Dow Chemical Co., Tactix 123, and Araldite® 184 supplied by Huntsman Advanced Materials). Examples of trifunctional epoxy resins include triglycidyl ether of aminophenol, e.g. Araldite® MY 0510, MY 0500, MY 0600, MY 0610 supplied by Huntsman Advanced Materials. Examples of tetrafunctional epoxy resins include tetraglycidyl ether of methylene dianiline (e.g. Araldite® MY 9655 supplied by Huntsman Advanced Materials), tetraglycidyl diaminodiphenyl methane (e.g., Araldite® MY-721, MY-720, 725, MY 9663, 9634, 9655 supplied by Huntsman Advanced Materials), EJ-190 from JSI Co., Ltd., and ERISYS GE-60 from CVC Chemical, Inc.

Suitable curing agents include, for example, guanidines (including substituted guanidines), ureas (including substituted ureas), melamine resins, guanamine, amines (including primary and secondary amines, aliphatic and aromatic amines), amides, anhydrides, and mixtures thereof. Particularly suitable are latent amine-based curing agents, which can be activated at a temperature greater than 160° F. (71° C.), preferably greater than 200° F. (or 93° C.), e.g. 350° F. (176° C.). Examples of suitable latent amine-based curing agents include dicyandiamide (DICY), guanamine, guanidine, aminoguanidine, and derivatives thereof. A particularly suitable latent amine-based curing agent is dicyandiamide (DICY).

A curing accelerator may be used in conjunction with the latent amine-based curing agent to promote the curing reaction between the epoxy resins and the amine-based curing agent. Suitable curing accelerators may include alkyl and aryl substituted ureas (including aromatic or alicyclic dimethyl urea); bisureas based on toluenediamine or methylene dianiline. An example of bisurea is 2,4-toluene bis (dimethyl urea). As an example, dicyandiamide (DICY) may be used in combination with a substituted bisurea as a curing accelerator.

Toughening agents may include thermoplastic or elastomeric polymers, and polymeric particles such as core-shell rubber (CSR) particles. Suitable thermoplastic polymers include polyarylsulphones with or without reactive functional groups. An example of polyarylsulphone with functional groups include, e.g. polyethersulfone-polyetherethersulfone (PES-PEES) copolymer with terminal amine functional groups. Suitable elastomeric polymers include carboxyl-terminated butadiene nitrile polymer (CTBN) and amine-terminated butadiene acrylonitrile (ATBN) elastomer.

In preferred embodiments, the CSR particles have a soft core with elastomeric or rubbery properties comprised of, for example, a diene homopolymer or copolymer (more particularly, a homopolymer of butadiene or isoprene, a copolymer of butadiene or isoprene with one or more ethylenically unsaturated monomers such as vinyl aromatic monomers, (meth)acrylonitrile, (meth)acrylates, or the like) surrounded by a hard shell comprised of a non-elastomeric polymeric material. The shell may be composed of a polymer or copolymer of one or more monomers such as (meth)acrylates (e.g., methyl methacrylate), vinyl aromatic monomers (e.g., styrene), vinyl cyanides (e.g., acrylonitrile), unsaturated acids and anhydrides (e.g., acrylic acid), (meth) acrylamides, and the like having a suitably high glass transition temperature.

Preferably, the CSR particles are relatively small in size, preferably, 300 nm or less in particle size. For example, the CSR particle size may be from about 30 nm to about 300 nm. In some embodiments, the particle size is in the range of 50-100 nm. In other embodiments, the particle size is within the range of 150 nm to 300 nm. Particle size can be determined by dynamic light scattering, using, for example, a Malvern Zetasizer 2000.

Examples of CSR particles include those commercially available under the trademark Kane Ace®, such as MX 120, MX 125, and MX 156 (all containing 25 wt. % CSR particles dispersed in liquid Bisphenol A epoxy).

In some embodiments, the toughening agent is a pre-react or reaction product formed by reacting a bisphenol such as bisphenol A with an epoxy resin in the presence of a catalyst such as triphenyl phosphine (TPP) for the bisphenol-epoxy reaction. The reaction mixture may further include CSR particles and/or a thermoplastic polymer. Suitable thermoplastic polymers for the pre-react include polyethersulfone (PES) and PES-PEES copolymer with amine end groups.

The amount of toughening agent in the adhesive composition may be up to about 40% by weight based on the total weight of the composition, in some embodiments, 5% to 20% by weight.

Inorganic fillers in particulate form (e.g. powder) may also be added to the adhesive composition as a rheology modifier to control the flow of the resinous composition and to prevent agglomeration therein. Suitable inorganic fillers include, but are not limited to, fumed silica, talc, mica, calcium carbonate, alumina, ground or precipitated chalks, quartz powder, zinc oxide, calcium oxide, and titanium dioxide. Coloring dyes or pigments may also be added to the adhesive composition to adjust the color of the adhesive.

The adhesive layer used for bonding may be prepared by combining the components of the adhesive composition and form a resinous film from the composition on a release paper using a conventional film coating technique. The adhesive layer may have a film weight of from 0.02 psf to 0.15 psf (or 100 gsm to 700 gsm). The binder-containing veil is then pressed into the resinous film while the film is in a soften/molten state until the veil is embedded. Alternatively, the veil is interposed between two resinous films, which are pressed together. The embedded veil functions as a carrier for the adhesive layer and is useful for controlling the bondline thickness between the bonded surfaces.

Bonding Methods

The bonding method of the present disclosure includes joining two substrates using the curable adhesive layer described above, followed by curing. The adhesive layer is interposed between the joined substrates. The substrates to be bonded together may be metal to metal, metal to composite, composite to composite, composite to honeycomb structure. The composite substrates in this context refer to fiber-reinforced polymer composites composed of reinforcement fibers impregnated or infused with a matrix material.

Bonding of composite structures includes: (1) co-curing, (2) co-bonding, and (3) secondary bonding.

"Co-curing" involves joining uncured composite parts by simultaneously curing and bonding, wherein the composite parts are being cured together with the adhesive, resulting in chemical bonding. However, it is difficult to apply this technique to the bonding of uncured prepregs to fabricate large structural parts with complex shapes. Uncured composite materials, e.g. prepregs, are tacky (i.e. sticky to the touch) and lack the rigidity necessary to be self-supporting. As such, uncured composite materials are difficult to handle. For example, it is difficult to assemble and bond uncured composite materials on tools with complex three-dimensional shapes.

"Co-bonding" involves joining a pre-cured composite part to an uncured composite part by adhesive bonding, wherein the adhesive and the uncured composite part are being cured during bonding. The pre-cured composite usually requires an additional surface preparation step prior to adhesive bonding.

"Secondary bonding" is the joining together of pre-cured composite parts by adhesive bonding, wherein only the adhesive is being cured. This bonding method typically requires surface preparation of each previously cured composite part at the bonding surfaces.

Composite Substrates

Composite substrates to be bonded include prepregs or prepreg layups (such as those used for making aerospace composite structures). The term "prepreg" as used herein refers to a layer of reinforcement fibers that has been impregnated with a curable matrix resin. The term "impregnate" refers to the introduction of a curable matrix resin material to reinforcement fibers so as to partially or fully encapsulate the fibers with the resin. The matrix resin in the composite substrates may be in an uncured or partially cured state. The term "prepreg layup" as used herein refers to a plurality of prepreg plies that have been laid up in a stacking arrangement. As an example, the number of prepreg plies in a layup may be 2 to 100 plies, or 10 to 50 plies. The layup of prepreg plies may be done manually or by an automated process such as Automated Tape Laying (ATL).

The prepreg plies within the layup may be positioned in a selected orientation with respect to one another. For example, prepreg layups may comprise prepreg plies having unidirectional fibers, with the unidirectional fibers in each prepreg oriented at a selected angle θ, e.g. 0°, 45°, or 90°, with respect to the largest dimension of the layup, such as the length.

For thermoset composite substrates, the matrix material contains one or more thermoset resins, curing agents, and optional additives such as, catalysts, rheology modifiers, inorganic or organic fillers, thermoplastic or elastomeric toughening agents, stabilizers, pigments/dyes, flame retardants, reactive diluents, and other additives well known to those skilled in the art for modifying the properties of the resin matrix before or after curing.

The thermoset resins include, but are not limited to, epoxy resins, unsaturated polyester resin, bismaleimide, polyimide, cyanate ester, phenolic, benzoxazines, and combinations thereof. Particularly suitable are multifunctional epoxy resins (or polyepoxides) described above for the adhesive composition. The curing agents for thermoset resins are as described above for the adhesive composition.

The toughening agents may include thermoplastic and elastomeric polymers, polymeric particles such as CSR particles, polyimide particles, polyamide particles, and combinations thereof.

In general, the reinforcement fibers in the composite substrates may take the form of chopped fibers, continuous fibers, filaments, tows, bundles, sheets, plies, and combinations thereof. Continuous fibers may further adopt any of unidirectional (aligned in one direction), multi-directional (aligned in different directions), non-woven, woven, knitted, stitched, wound, and braided configurations, as well as swirl mat, felt mat, and chopped mat structures. The fiber materials include, but are not limited to, glass (including Electrical or E-glass), carbon, graphite, aramid, polyamide, high-modulus polyethylene (PE), polyester, poly-p-phenylene-benzoxazole (PBO), boron, quartz, basalt, ceramic, and combinations thereof.

Terminology

In the present disclosure, the terms "cure" and "curing" as used herein encompass polymerizing and/or cross-linking of monomers or oligomers brought about by mixing of based components, heating at elevated temperatures, exposure to ultraviolet light and radiation. "Fully cured" as used herein refers to 100% degree of cure. "Partially cured" as used herein refers to less than 100% degree of cure.

The modifier "about" used in connection with a quantity is inclusive of the stated value and has the meaning dictated by the context, (e.g., includes the degree of error associated with measurement of the particular quantity). For example, a number following "about" can mean the recited number plus or minus 0.1% to 1% of that recited number. The suffix "(s)" as used herein is intended to include both the singular and the plural of the term that it modifies, thereby including one or more of that term (e.g., the metal(s) includes one or more metals). Ranges disclosed herein are inclusive of the endpoints and all intermediate values of the ranges, for example, "1% to 10%" includes 1%, 1.5%, 2%, 2.5%, 3%, 3.5%, etc.

EXAMPLES

The following Examples are provided to illustrate certain aspects of the present disclosure. In all cases, an epoxy-based film adhesive containing tougheners and curing agents, curable at 250° F. (121° C.), was used, and the support carrier was varied to assess the full effect of fabric on bonding performance.

Example 1

An epoxy-based film adhesive was formed by preparing a resin formulation containing in parts by weight: 125 parts of diglycidyl ether of bis-phenol A containing pre-dispersed nano-sized, 25 parts of bisphenol A, 6.5 parts of polyether sulfone, 0.1 parts of triphenyl phosphine, 5 parts of an amine terminated PES-PEES copolymer, 4 parts, of cyanoguanidine, and 2 parts of methylene diphenyl bis(dimethyl urea).

The resin formulation was coated onto a release paper at 140° F. to form an adhesive film with 0.06 psf (300 gsm) film weight. A polyamide (PA11) veil containing a polyamide binder was pressed into the adhesive film under vacuum until the veil is embedded. The amount of binder in the veil was less than 5% by weight. The polyamide binder had a $T_g$ of 60° C. (140° F.). Polyamide veils with different areal weights, 4 gsm, 10 gsm, and 20 gsm were used to form different adhesive films.

For comparison, the polyamide veil with binder was replaced with a glass veil (areal weight of 6 gsm) to form a "control" adhesive film.

Each adhesive film with the embedded veil was interposed between two aluminum panels, and the resulting laminate was cured at 3° F./min. to 250° F. for 90 min. at 40 psi.

For bonding performance testing of the bonded panels, the following test methods were used: Wide area lap shear (WALS) test performed according to ASTM D3165; Metal-Metal (M-M) peel test performed according to ASTM D3167.

Table 1 shows the test results for metal-metal bonding after Lap Shear Strength test and Peel Strength test.

TABLE 1

| Property | 6 gsm glass (control) | 4 gsm veil with polyamide binder | 10 gsm veil with polyamide binder | 20 gsm veil with polyamide binder |
|---|---|---|---|---|
| Lap Shear Strength on aluminum substrates @ 180° F. (82° C.) | 3955 psi (27.27 MPa) | 4576 psi (31.55 MPa) | 4360 psi (30.06 MPa) | 4667 psi (32.18 MPa) |
| Lap Shear Strength on aluminum substrates @ 250° F. (121° C.) | 3089 psi (21.30 MPa) | 3464 psi (23.88 MPa) | 3654 psi (25.19 MPa) | 3466 psi (23.90 MPa) |
| Hot/wet Lap Shear Strength on aluminum substrates @ 180° F. (82° C.) | 3161 psi (21.8 MPa) | 3770 psi (26.00 MPa) | 3417 psi (23.56 MPa) | 3320 psi (22.89 MPa) |
| M-M Peel on aluminum substrates @ 75° F. (24° C.) | 76 lb/in (338 N/25 mm) | 77 lb/in (343 N/25 mm) | 76 lb/in (338 N/25 mm) | 76 lb/in (338 N/25 mm) |
| M-M Peel on aluminum substrates @ 225° F. (107° C.) | 52 lb/in (231 N/25 mm) | 57 lb/in (254 N/25 mm) | 63 lb/in (280 N/25 mm) | 68 lb/in (303 N/25 mm) |

As shown in Table 1, the veil fabrics containing polyamide binder yielded significantly improved high temperature bond strength properties versus the control veil. The gain in bond strength was not accompanied by a decrease in peel strength as usually observed experimentally. Hot/wet performance was also improved using the veil containing the polyamide binder versus control, demonstrating the effectiveness of the binder-containing veil.

Example 2

An adhesive film with a binder-containing polyamide veil was prepared as disclosed in Example 1. CYCOM 5320-1 tape prepreg was pre-cured with a polyester peel ply by heating at 3° F./min to 350° F. for 2 h at 80 psi. The cured prepreg was cut into two panels to be bonded. The peel ply was removed to provide a roughened, bondable surface. The two prepreg panels were bonded together using the adhesive film and curing was carried out as described in Example 1. The resulting bonded laminate was labeled as "Laminate A".

For comparison, another bonded laminate was prepared in the same manner using an adhesive film containing the same resin composition but a different 20 gsm polyamide veil, which contained styrene acrylic binder. The resulting bonded laminate was labeled as "Comparison Laminate".

Table 2 shows the test results for the bonded laminates after Lap Shear Strength test.

TABLE 2

| Property | Comparison Laminate (veil with styrene acrylic binder) | Laminate A (veil with polyamide binder) |
| --- | --- | --- |
| Lap Shear Strength @ 75° F. (24° C.) | 5792 psi (39.93 MPa) | 6462 psi (44.55 MPa) |
| Lap Shear Strength @ 250° F. (121° C.) | 886 psi (6.11 MPa) | 1839 psi (12.68 MPa) |
| Lap Shear Strength @ 180° F. (82° C.) following exposure | 2264 psi (15.61 MPa) | 3463 psi (23.88 MPa) |

Data in Table 2 demonstrates the improvement in bond strength of the bonded composite laminate when the veil containing the polyamide binder was present as compared to the bonded laminate containing the veil without the same binder. In particular, high temperature Lap Shear strength was substantially increased for Laminate A as compared to the Comparison Laminate.

What is claimed is:

1. A bonding method comprising:
    (a) joining a first substrate to a second substrate with a curable adhesive layer between the substrates; and
    (b) curing the adhesive layer at a temperature above 25° C. to form a bonded structure,
    wherein
    the adhesive layer comprises a veil embedded in a curable matrix resin, the curable matrix resin comprises one or more thermoset resins and at least one curing agent, the veil comprises veil fibers and a polymeric binder, which is in a solid phase at room temperature (20° C.-25° C.); wherein the polymeric binder is distributed on the outer surfaces of the veil fibers and/or dispersed among the veil fibers throughout the veil, and during curing, the polymeric binder dissolves into the matrix resin.

2. The bonding method according to claim 1, wherein the polymeric binder is in the form of particles dispersed among the veil fibers throughout the veil.

3. The bonding method according to claim 1, wherein the polymeric binder is formed of a polymeric material selected from thermoplastic polymers, elastomeric polymers, and combinations thereof.

4. The bonding method according to claim 1, wherein the polymeric binder is formed of a thermoplastic polymer or copolymer having a glass transition temperature of less than 350° F., as determined by Dynamic Mechanical Analysis.

5. The bonding method according to claim 1, wherein the polymeric binder comprises a thermoplastic material selected from: polyamide, polyester, polyimide, polycarbonate, polyurethane, polyetherimide, polyethersulfone, poly(methyl methacrylate), polystyrene, polyarylsuphone, copolymers thereof, and combinations thereof.

6. The bonding method according to claim 1, wherein the polymeric binder comprises a copolymer of polyamide 11 ("PA11") and polyamide 12 ("PA12").

7. The bonding method according to claim 6, wherein the ratio of PA11 to PA12 is 20:80 to 80:20.

8. The bonding method according to claim 1, wherein the fibrous veil is a nonwoven veil, a woven fabric or a knitted mat.

9. The bonding method according to claim 1, wherein the fibrous veil has an areal weight of about 2 to about 150 gsm.

10. The bonding method according to claim 1, wherein the fibrous veil comprises polymeric fibers or glass fibers.

11. The bonding method according to claim 1, wherein the curable matrix resin of the adhesive layer comprises one or more epoxy resins and at least one amine curing agent.

12. The bonding method according to claim 11, wherein the curable matrix resin further comprises a toughening material selected from: thermoplastic polymers, elastomeric polymers, polymeric particles, core-shell rubber (CSR) particles, and combinations thereof.

13. The bonding method according to claim 1, wherein the first substrate is selected from a metallic substrate, a composite substrate, and a honeycomb structure, and the second substrate is selected from a metallic substrate, a composite substrate, and a honeycomb structure.

14. The bonding method according to claim 13, wherein the composite substrate is a prepreg or a prepreg layup comprising a plurality of prepregs arranged in a stacking arrangement, wherein each prepreg comprises continuous, unidirectional fibers impregnated with a thermosetting resin composition.

15. An adhesive film comprising a veil embedded in a curable matrix resin, wherein
    the curable matrix resin comprises one or more epoxy resins and at least one curing agent,
    the veil comprises randomly arranged polymeric veil fibers or glass veil fibers and a copolymer of polyamide 11 ("PA11") and polyamide 12 ("PA12") as a polymeric binder, which is in a solid phase at room temperature (20° C.-25° C.) and has a glass transition temperature of less than 350° F., as determined by Dynamic Mechanical Analysis; wherein the polymeric binder is distributed on the outer surfaces of the veil fibers and/or dispersed among the veil fibers throughout the veil.

16. The adhesive film of claim 15, wherein the curable matrix resin comprises one or more polyepoxides, an amine curing agent, and a toughening material selected from:

polyarylsulphones with or without reactive functional groups, core-shell rubber (CSR) particles, elastomeric polymers, and combinations thereof.

17. The adhesive film of claim 15, wherein the curable matrix resin comprises one or more polyepoxides, an amine curing agent, and a pre-react product formed by reacting bisphenol A with an epoxy resin in the presence of a catalyst, core-shell rubber (CSR) particles, and a polyarylsulphone.

18. A bonded structure comprising two substrates joined to each other and an adhesive film interposed between the substrates, wherein
- at least one of the substrates is a metallic substrate,
- the adhesive layer comprises a veil embedded in a curable matrix resin, which comprises one or more thermoset resins and at least one curing agent,
- the veil comprises intermingled, randomly arranged polymeric or glass veil fibers and a polymeric binder in an amount sufficient for holding the fibers together, wherein the polymeric binder is distributed on the outer surfaces of the veil fibers and/or dispersed among the veil fibers throughout the veil, is in a solid phase at room temperature (20° C.-25° C.) and has a glass transition temperature of less than 350° F. as determined by Dynamic Mechanical Analysis.

19. The bonded structure of claim 18, wherein the two substrates are metallic substrates.

20. The bonded structure of claim 18, wherein the polymeric binder comprises a copolymer of polyamide 11 ("PA11") and polyamide 12 ("PA12").

* * * * *